US008849977B2

(12) United States Patent
Kristiansson et al.

(10) Patent No.: US 8,849,977 B2
(45) Date of Patent: Sep. 30, 2014

(54) METHOD AND A CONTROL NODE IN AN OVERLAY NETWORK

(75) Inventors: Johan Kristiansson, Lulea (SE); Andreas Ekeroth, Lulea (SE); Du Li, Palo Alto, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 249 days.

(21) Appl. No.: 13/416,323

(22) Filed: Mar. 9, 2012

(65) Prior Publication Data

US 2013/0238741 A1 Sep. 12, 2013

(51) Int. Cl.
*G06F 15/173* (2006.01)

(52) U.S. Cl.
USPC .......................................... 709/223; 709/217

(58) Field of Classification Search
CPC .... H04W 84/20; G06F 15/167; G06F 15/177; H04L 29/08459; H04L 67/10
USPC ........................ 709/223, 224, 203, 209, 217
See application file for complete search history.

(56) References Cited

U.S. PATENT DOCUMENTS

| | | | | |
|---|---|---|---|---|
| 6,553,465 B1 * | 4/2003 | Takusagawa | ................ | 711/152 |
| 6,633,538 B1 * | 10/2003 | Tanaka et al. | ................ | 370/222 |
| 7,401,132 B1 * | 7/2008 | Krumel et al. | ................ | 709/220 |
| 7,461,147 B1 * | 12/2008 | Mowat et al. | ................ | 709/225 |
| 7,792,915 B2 * | 9/2010 | Berkey et al. | ................ | 709/209 |
| 7,801,026 B2 * | 9/2010 | Kurasawa et al. | ............ | 370/217 |
| 8,060,619 B1 * | 11/2011 | Saulpaugh et al. | ........... | 709/227 |
| 8,281,023 B2 * | 10/2012 | Dondeti et al. | ............... | 709/229 |
| 8,320,282 B2 * | 11/2012 | Rollins | ......................... | 370/258 |
| 2003/0041108 A1 * | 2/2003 | Henrick et al. | ............... | 709/205 |
| 2003/0167420 A1 * | 9/2003 | Parsons | ........................... | 714/10 |
| 2004/0078449 A1 * | 4/2004 | Tanaka et al. | ................. | 709/208 |
| 2004/0098390 A1 * | 5/2004 | Bayliss et al. | .................... | 707/7 |
| 2005/0063318 A1 * | 3/2005 | Xu et al. | ........................ | 370/254 |
| 2006/0206634 A1 * | 9/2006 | Torisaki et al. | ................. | 710/22 |
| 2008/0320051 A1 * | 12/2008 | Murotani et al. | ............. | 707/200 |
| 2009/0063668 A1 * | 3/2009 | Bish et al. | ..................... | 709/223 |
| 2009/0100289 A1 | 4/2009 | Chen et al. | | |

(Continued)

FOREIGN PATENT DOCUMENTS

EP 0 629 949 A2 12/1994

OTHER PUBLICATIONS

International Search Report, PCT Application No. PCT/SE2012/050276, Jun. 18, 2012.

(Continued)

*Primary Examiner* — Lashonda Jacobs
(74) *Attorney, Agent, or Firm* — Myers Bigel Sibley & Sajovec, P.A.

(57) ABSTRACT

A first control node and a method therein for selecting the first control node or a second control node to act as a server are provided. The first and second control nodes are comprised in an overlay network. The first control node obtains a first indication relating to a ranking of a suitability of the first control node to act as the server. Furthermore, the first control node receives a second indication from the second control node. The second indication relates to a ranking of a suitability of the second control node to act as the server. Then, the first control node selects, based on the first and second indications, one of the first and second control nodes to act as the server for managing a master representation of a distributed shared memory being accessible within the overlay network.

24 Claims, 4 Drawing Sheets

(56) References Cited

U.S. PATENT DOCUMENTS

| | | | |
|---|---|---|---|
| 2009/0190496 A1* | 7/2009 | Mohamed-Rasheed et al. | 370/254 |
| 2009/0265458 A1* | 10/2009 | Baker et al. | 709/224 |
| 2009/0323696 A1* | 12/2009 | Schwan et al. | 370/395.31 |
| 2010/0027442 A1* | 2/2010 | Chockler et al. | 370/254 |
| 2010/0202448 A1* | 8/2010 | Previdi et al. | 370/389 |
| 2010/0309789 A1* | 12/2010 | Previdi et al. | 370/238 |
| 2011/0219072 A1* | 9/2011 | Yang et al. | 709/204 |
| 2011/0246674 A1* | 10/2011 | Ushiyama | 709/250 |
| 2012/0011398 A1* | 1/2012 | Eckhardt et al. | 714/15 |
| 2012/0185553 A1* | 7/2012 | Nelson | 709/209 |
| 2012/0222095 A1* | 8/2012 | Ushiyama | 726/4 |
| 2012/0284227 A1* | 11/2012 | Bourbonnais et al. | 707/613 |
| 2013/0007131 A1* | 1/2013 | Chen et al. | 709/204 |
| 2013/0136120 A1* | 5/2013 | Wu | 370/352 |
| 2013/0262670 A1* | 10/2013 | Tamura | 709/224 |

OTHER PUBLICATIONS

Written Opinion of the International Searching Authority, PCT Application No. PCT/SE2012/050276, Jun. 18, 2012.

Jan Sacha et al.: "A Gradient Topology for Master-Slave Replication in Peer-to-Peer Environments", Aug. 28, 2006, Databases, Information Systems, and Peer-to-Peer Computing; [Lecture Notes in Computer Science;; LNCS], Springer Berlin Heidelberg, pp. 86-97, XP019057144, ISBN: 978-3-540-71660-0 abstract.

Diego Doval et al.: "overlay Networks a Scalable Alternative for P2P", Jul. 1, 2003, pp. 79-82, XP55029187, URL:http://ieeexplore.ieee.org/ielx5/4236/27339/01215663.pdf?tp=&arnumber=1215663&isnumber=27339.

* cited by examiner

METHOD AND A CONTROL NODE IN AN OVERLAY NETWORK

TECHNICAL FIELD

Embodiments herein relate to a first control node and a method therein for selecting the first control node or a second control node to act as a server for a Distributed Shared Memory being accessible within an overlay network.

BACKGROUND

The Web is becoming more interactive than it has ever been before. It is now possible to implement synchronous video conferencing applications running in a web browser either using plug-ins or new Hyper Text Markup Language 5 (HTML5) Application Programming Interfaces (APIs) which will become widespread in a near future. Eventually, this will make it possible to implement cost effective and highly customized solutions for various vertical markets—for example e-health—rather than having to use a big, generic, one-size-fit-all horizontal solution.

While video and audio conferencing running in a web browser makes it possible to communicate in new ways, it essentially turns a web browser, executing a customized collaboration application, into a synchronous communication platform. This also leads users to expect that other user interface components managed by the collaboration application also form a part of the communication. For example, in an e-health application, users may want to share items like diagrams, pictures, sensor data, text documents or even run web applications together with peers, e.g. other users, in a conference session. A natural complement is, therefore, some kind of synchronization framework that allows the users to share the items managed by the collaboration applications with each other.

An example of a collaborative web application framework is called

Distributed Shared Memory (DSM) framework. The DSM framework makes it possible to synchronously share data of a web application in real-time with other users. This is possible since the DSM framework provides a memory, or data storage, that can be shared between web applications. In short, the DSM is a distributed global addressable memory space where every memory space is assigned a unique address. By knowing this address, it is possible to get a copy or reference to that memory.

In FIG. 1, a schematic block diagram an exemplifying implementation of DSM is shown. In this example, an exemplifying DSM Server 1 manages a DSM Master 2, referred to as memory or data storage above. Each of two DSM Clients 3, 4 manages a respective DSM Replica 5, 6. Moreover, each of the DSM Clients 3, 4 comprises a respective User interface 7, 8 for interaction, by a user equipment, with the respective DSM Replica 5, 6. Hence, in this example each DSM Client 3, 4 acquires the DSM Replica 5, 6, i.e. a local copy, of the DSM Master 2 and then synchronizes each of the DSM Replicas 5, 6 when needed. Synchronization is needed when contents of the DSM Replicas 5, 6 differs from contents of the DSM Master 2. Any modification to a particular DSM Replica 5, 6 is synchronized so that every DSM Replica converges to the same state after some time. At start up, the DSM Server 1 creates the DSM Master implicitly if requested by any DSM Client. Moreover, when no DSM Client is connected to the DSM Master, the DSM Master is automatically garbage collected. This means that any memory allocated by the DSM Master is no longer locked to the DSM Master.

As an example, a developer may use Web Connectivity, which is an API framework, to create an overlay network in the application layer. In the overlay network, applications, running in any context, have a uniquely addressable Unique Resource Identifier (URI). These applications may act as servers in the overlay network. These URIs are uniform for the application, regardless of whether it runs on a server or client, native or browser. One use of the Web Connectivity API is to create, on the fly, a server in a web application, which is executed in a runtime environment of a web browser. Once the session ends, and the user navigates away from the current page, the server is shut down and becomes inaccessible. It shall also be said that Web Connectivity is sometimes referred to as Warp.

SUMMARY

An objective of at least some embodiments is to improve web collaborative frameworks, such as the DSM framework mentioned above. This and other objectives may be achieved by one or more embodiments of the present invention disclosed herein.

According to an aspect, a method is provided in a first control node for selecting the first control node or a second control node to act as a server. The first and second control nodes and a subscription managing node are comprised in an overlay network. The overlay network is overlaid onto an IP-network. The subscription managing node is configured to provide a communication channel of the overlay network between the first and second control nodes. The first control node obtains a first indication relating to a ranking of a suitability of the first control node to act as the server. Furthermore, the first control node receives, over the communication channel, a second indication from the second control node via the subscription managing node. The second indication relates to a ranking of a suitability of the second control node to act as the server. Then, the first control node selects, based on the first and second indications, one of the first and second control nodes to act as the server for managing a master representation of a Distributed Shared Memory (DSM) being accessible within the overlay network.

According to another aspect, a first control node is provided that is configured to select the first control node or a second control node to act as a server. The first and second control nodes are configured to be comprised in an overlay network. The overlay network is configured to be overlaid onto an IP-network. Furthermore, the overlay network is configured to comprise a subscription managing node. The subscription managing node is configured to provide a communication channel of the overlay network between the first and second control nodes. The first control node comprises a processing circuit configured to obtain a first indication relating to a ranking of a suitability of the first control node to act as the server. The processing circuit is further configured to select, based on the first and second indications, one of the first and second control nodes to act as the server for managing a master representation of a distributed shared memory being accessible within the overlay network. Moreover, the first control node comprises a receiver configured to receive, over the communication channel, a second indication, from the second control node via the subscription managing node. The second indication relates to a ranking of a suitability of the second control node to act as the server.

According to a still further aspect, a computer program product is provided that is configured to perform one or more embodiments of the method in the first control node.

Since the first control node obtains the first and second indications relating to a ranking of a suitability of the first control node and the second control node, respectively, to act as the server, the first control node is able to select, or determine, which one out of the first and second control nodes to be set as the server. In this manner, the DSM is made less dependent on a permanent server for hosting of a master representation of the Distributed Shared Memory (DSM), also referred as a DSM Master. Thus, the DSM has been improved in that it is less dependent on a permanent server. Consequently, the above mentioned objective is achieved. Thanks to that the DSM is less dependence on a permanent server, the DSM framework becomes more robust in terms of availability.

An advantage that may be provided by one or more embodiments herein is that logic involved in selection of control node to act as server is implemented in control nodes, such as the first control node, of the overlay network. Therefore, it is preferred that all control nodes selects who to act as the server based on the same or similar criteria. However, in a web based system, an upgrade of a control node is obtained by a refresh of a web page comprising all or parts of the DSM.

Hence, by leaving it to the control nodes to decide at each specific time which control node should act as the server, the most suitable control node may at any time take the role to act as the server.

Moreover, there is no need to wait for a specific server to come online before users may begin to work with a replica, i.e. a copy of a master representation of the DSM.

Also, a user or a developer using the DSM framework do not need to take into consideration which entity, such as a computer or other node in the overlay network, should act as the server.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
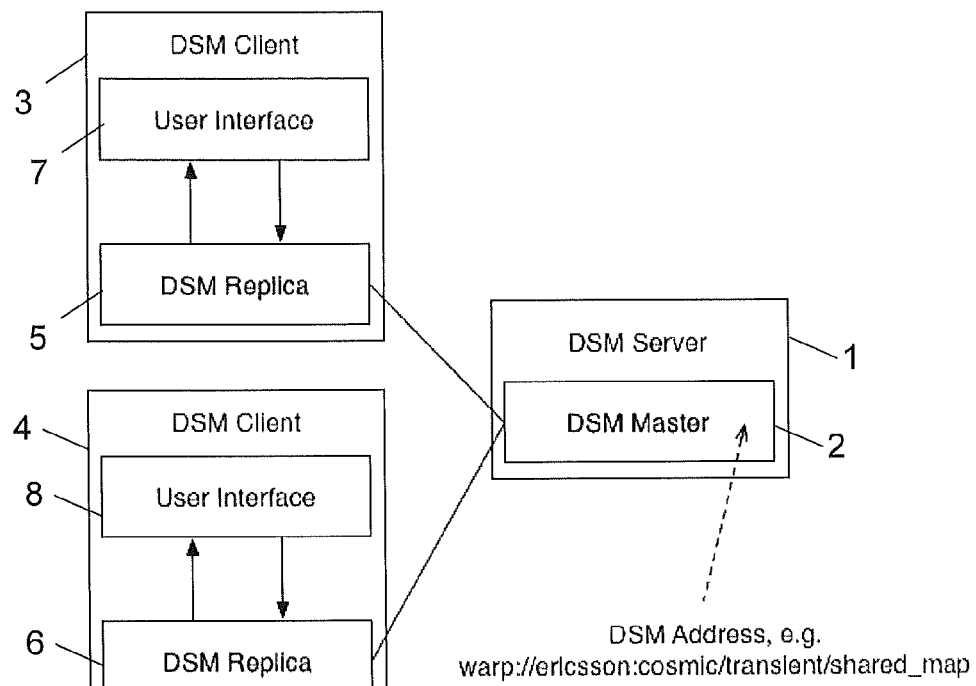
FIG. 1 shows a schematic block diagram of an exemplifying implementation of a DSM framework according to prior art.

Throughout the following description similar reference numerals have been used to denote similar elements, network nodes, parts, items or features, when applicable.

As part of describing embodiments herein, a problem will be identified and discussed in the following.

By combining a framework like DSM with Web Connectivity, it is possible to create a client-server architecture in an overlay network. The overlay network is overlaid onto an IP network. The IP network comprises nodes, such as Personal Computers, pieces of hardware in a computer cluster or the like. In such client-server architecture, the server functionality may move around among the nodes. That is to say, any node may host a DSM Master. Any DSM Master can then be addressed using a unified addressing schema.

In normal client server architecture, the server is located at an address that normally does not change very often. Thus, clients connect to the server while using the address. However, as in the case with the client-server architecture based on a combination of DSM and network overlay network framework such as the aforementioned Web Connectivity API, all nodes can act as both a server and a client. Therefore, the server address space becomes much more complex and how to find a server becomes a much more complicated task.

According to prior art, a server is not always referenced directly by its address, but rather by a domain name. In this case, a Domain Name Server (DNS) is used to lookup the server address. If this approach is used in a system such as the DSM framework where servers come and go frequently, it become quite problematic to keep the DNS up to date. If the DNS is not up to date, clients will not be able to access the server by referring to its domain name.

In an exemplifying peer-to-peer context, two clients are running the exact same software and would like to share something using DSM. Then, it is not trivial to determine who should host the DSM server and how would the address for that sever be communicated between the peers.

Figure 2:
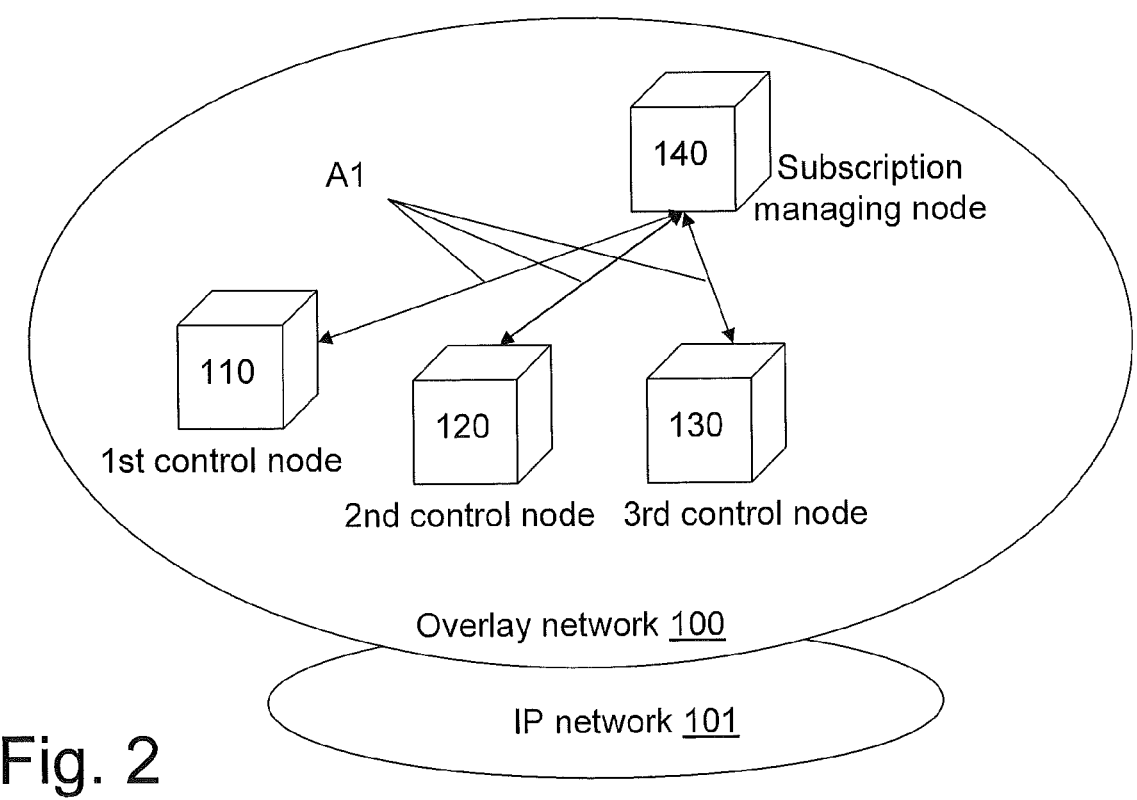
FIG. 2 shows a schematic block diagram of an exemplifying overlay network in which exemplifying methods according embodiments herein may be implemented.

FIG. 2 shows an overlay network 100, in which embodiments herein may be implemented. The overlay network is overlaid onto an IP network 101, such as a Transmission Control Protocol/Internet Protocol network (TCP/IP-network).

The overlay network 100 comprises a first control node 110, a second control node 120, a third control node 130. As used herein, the expression "control node" may refer to a user equipment, a mobile phone, a cellular phone, a Personal Digital Assistant (PDA), a smartphone, a laptop equipped, a portable electronic communication device, a general purpose computer or the like.

The first, second and third control nodes 110, 120, 130 may be capable of acting as a server or a client within the overlay network 100. This means for example that the first control node 110 may sometimes act as the server for managing a master representation of a DSM. In other occasions, the first control node 110 may act as the client managing a replica of the master representation of the DSM. In these occasions, the second or third control node 120, 130 acts as the server.

Furthermore, the overlay network 100 comprises a subscription managing node 140, such as a publish and subscribe (publish/subscribe) service in the aforementioned Web connectivity API. The subscription managing node 140 is configured to provide a communication channel A1 between the first, second and third control nodes 110, 120, 130 in the overlay network 100. Any information, transferred in the communication channel A1 between the first, second and third control nodes 110, 120, 130, is passed through, or via, the subscription managing node 140.

The communication channel may be associated with an identifier, such as a key, which may be used for identification of the communication channel. The key may be referred to as a service key, since the subscription managing node provides the publish and subscribe service.

As an example, the publish and subscribe service is comprised in the subscription managing node 140. The subscription managing node 140 may be responsible for relaying incoming messages to any other nodes, such as one or more of the control nodes 110, 120, 130. The incoming messages refer to messages received by the subscription managing node 140. The subscription managing node 140 relays any incoming message to all nodes, which subscribe to messages published with the identifier. A message sent to the publish and subscribe service, i.e. the subscription managing node 140, with that identifier will be relayed to all other nodes which subscribe to that specific identifier.

Figure 3:
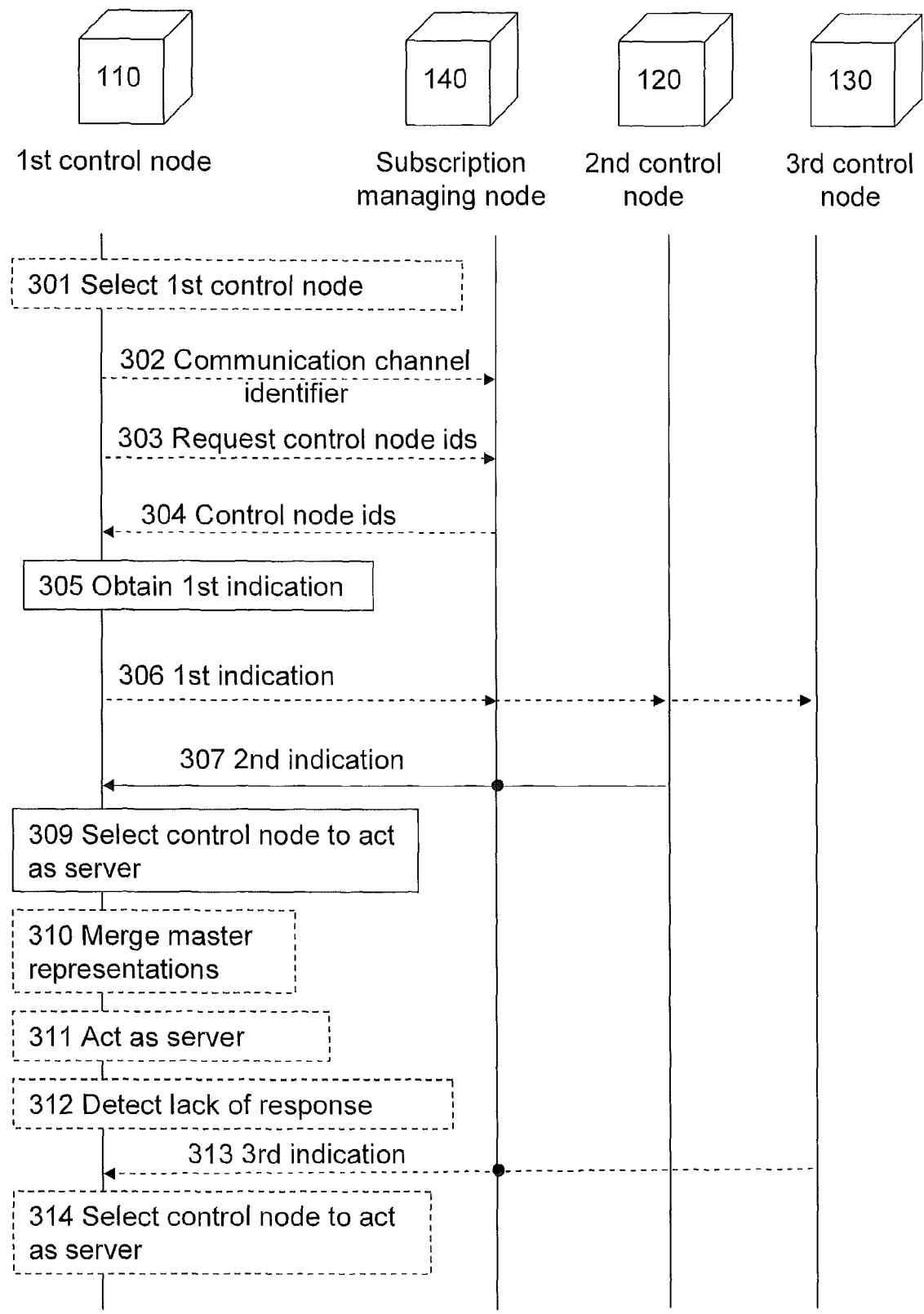
FIG. 3 shows a schematic, combined signalling scheme and flowchart of the exemplifying methods performed in the radio communication system according to FIG. 2.

In FIG. 3, a schematic combined signalling and flow chart of an exemplifying method for selecting the first control node 110 or the second control node 120 to act as the server is shown. As mentioned, the first and second control nodes 110, 120 and the subscription managing node 140 are comprised in the overlay network 100, which is overlaid onto an IP-network 101. Again, the subscription managing node 140 is configured to provide the communication channel of the overlay network 100 between the first and second control nodes 110, 120.

The method may comprise the following actions, which may be performed in any suitable order. For each of the actions below, the action will be described and exemplified. Following the description and example, purpose, effects and the like may be discussed. In FIG. 3, exemplifying actions that appear in only some embodiments are indicated by dashed lines.

Action 301

The first control node 110 may select the first control node 110 to act as the server. As a result, time for initializing and starting the functionality related to the DSM may be reduced.

When this action is performed before action 309, i.e. the selecting of the first or second control node 120, the first control node 110 is allowed to directly act as the server. Moreover, the first control node 110 need not wait until indications relating to ranking of other control nodes have been received from one or more other control nodes via the subscription managing node 140 when this action is performed.

In an exemplifying scenario, the second control node 120 may simultaneously act as the server. In this scenario, multiple control nodes, such as the first and second control nodes 110, 120 are allowed to act as the server simultaneously. How to deal with this is further described below in action 310 and 311.

Action 302

In some embodiments, the first control node 110 sends an identifier associated with the communication channel to the subscription managing node 140. In this manner, the communication channel is established. As mentioned above, the communication channel is dedicated for use of the Distributed Shared Memory.

Action 303

The first control node 110 may send a request for identifications of control nodes to the subscription managing node 140. In this manner, the first control node 110 obtains information about which control nodes are available to choose from when performing action 309.

Action 304

According to some embodiments, the first control node 110 receives a set of identifications of control nodes from the subscription managing node 140. This action may be performed in response to the request sent in action 303.

Action 305

The first control node 110 obtains a first indication relating to a ranking of a suitability of the first control node 110 to act as the server. In this manner, the first control node 110 is made aware of the first indication, which will be used in action 309. The first indication will be described in more detail below.

The first indication may be obtained by that the first control node 110 receives the first indication relating to ranking of the first control node 110 from the subscription managing node 140.

Alternatively or additionally, the first indication may be obtained by that the first control node 110 obtains the first indication from a memory comprised in the first control node 110.

Action 306

The first control node 110 may send the first indication, relating to ranking of the first control node 110 as the server, to the subscription managing node 140. The subscription managing node 140 may forward the first indication to the second and/or third control nodes 120, 130, which subscribes to the identifier mentioned in conjunction with FIG. 2.

Action 307

The first control node 110 receives, over the communication channel, a second indication from the second control node 120. The second indication is received via the subscription managing node 140. The second indication relates to a ranking of a suitability of the second control node 120 to act as the server. In this manner, the first control node 110 is made aware of the second indication relating to ranking of the second control node 120. The second indication will be described below.

As mentioned above, after this action and action 305 above have been performed, the first control node 110 may compare the first and second indications in order to select which of the first and second control nodes 110, 120 to act as the server.

Action 309

At this stage the first control node 110 is aware of the first and second indications. Thus, the first control node 110 selects, based on the first and second indications, one of the first and second control node 110, 120 to act as the server for managing the master representation of the distributed shared memory being accessible within the overlay network 100. In this manner, the most suitable node of the first and second control nodes 110, 120 may be selected to act as the server given the information provided by the first and second indications.

In some embodiments, the first control node 110 is selected to act as the server when one or more of the following conditions are fulfilled:

the first ranking value is greater than the second ranking value;

the first start time is before the second start time;

the first number of clients is greater than the second number of clients;

the first connection speed is greater than the second connection speed; and the first control runs on better hardware or has higher battery power capacity.

As a first example, the first indication comprises the first start time and the second indication comprises the second start time. In this example, the first control node 110 receives indications, such as the first and second start time.

The first control node 110 may then calculate the first and second ranking values based on the first and second start time. Next, the first control node 110 is able to check if the condition that the first ranking value is greater than the second ranking value is fulfilled when selecting the first control node 110, i.e. itself, to act as the server.

Alternatively, or even additionally, the first control node 110 may check if the condition that the first start time is before the second start time is fulfilled when selecting itself to act as the server. Hence, the first control node 110 checks the appropriate condition without calculating the first and second ranking values.

As a second example, the first indication comprises the first ranking value and the second indication comprises the second ranking value. In this example, the first control node 110 receives indications, such as the first and second ranking values.

The first control node 110 may then directly check if the condition that the first ranking value is greater than the second ranking value is fulfilled when selecting itself to act as the server. By checking the condition directly, it is meant that no calculation of the first and second ranking values are required as in one alternative of the first example directly above.

Action 310

This action may be performed when the second control node 120 acts as a further server for managing a further master representation of the distributed shared memory. Thus, in this action multiple servers exist. For example, the second control node 120 may have performed an action similar to action 301. Thereby, the second control node 120 acts as the further server.

After the selecting of the first or second control node 120 in action 309, the first control node 110 may merge the master representation and the further master representation. One of way to merge the data is to calculate a patch and then apply the patch on the other replica. A patch can for example be calculated using Meyers Diff algorithm. See http://neil.fraser-.name/software/diff_match_patch/myers.pdf.

In this action, any existing multiple servers, as allowed in action 301, are merged into only one server.

Action 311

Since the first control node 110 was selected to act as the server in action 309, the first control node 110 may act as the server for the merged master representation. The second control node 110 is then configured to act as a client to the server.

Action 312

Contrary, to the scenario in action 311, the second control node 120 is the server, or acts as the server, in this scenario. As mentioned above, the overlay network further comprises the third control node 130.

The first control node 110 may detect lack of response, or lack of responsiveness, from the server. The server, such as the second control node 120, may have lost its connection to the subscription manager 140 due overload or any other reason. In action 313 and 314, it is described how the first control node 110 handles the detected lack of response, or responsiveness.

Action 313

The first control node 110 may receive a third indication relating to ranking of the third control node 130 from the third control node 130 via the subscription managing node 140. The reception of the third indication may occur in response to that the first control node 110 sends a request for indications to the subscription managing node 140.

The third control node 130 has sent the identifier to the subscription managing node 140. As a result, the third control node 130 is hooked into the communication channel. In this manner, the third control node 130 may exchange information via the subscription managing node 140 with the first and/or second control node 110, 120.

Action 314

In some embodiments, the first control node 110 selects the first or third control node 110, 130 to act as the server based on the first and third indication. Similarly to action 309, the first control node 110 may select the most suitable node out of the first and third control nodes 110, 130, to act as the server for managing the DSM. Hence, if a server crashes, actions 312-314 provides means for automatic recovery. In this manner, most or all of the DSM may be reconstructed. Thereby, loss of information is avoided.

The first indication relating to ranking may be indicative of probability that the first control node 110 remains accessible within the overlay network 100. Furthermore, the first indication relating to ranking may comprise information about one or more of:

a first ranking value for the first control node 110;
a first start time of the first control node 110,
a first number of clients connected to the first control node 110 if acting as the server or a further server for managing the distributed shared memory,
a first connection speed of the first control node 110,
a first reliability of connection between the first control node and the subscription managing node 140,
power supply of the first control node 110, and
type of hardware of the first control node 110.

The second indication relating to ranking may comprise information about one or more of:

a second ranking value of the second control node 120;
a second start time of the second control node 120,
a second number of clients connected to the second control node 120 if acting as the server or a further server for managing the distributed shared memory,
a second connection speed of the second control node 120,
a second reliability of connection between the second control node and the subscription managing node 140,
power supply of the second control node 120, and
type of hardware of the second control node 120.

The third indication relating to ranking may comprise information about parameters corresponding to those listed above for the first and second indication.

An advantage is that it is be possible to implement a user centric device cloud, where server functionality may move around between different devices and do not need to reside on a continuously running server node. The clients do not need to know the address to any server. Instead, the clients share the identifier, which may be a common key.

Figure 4:
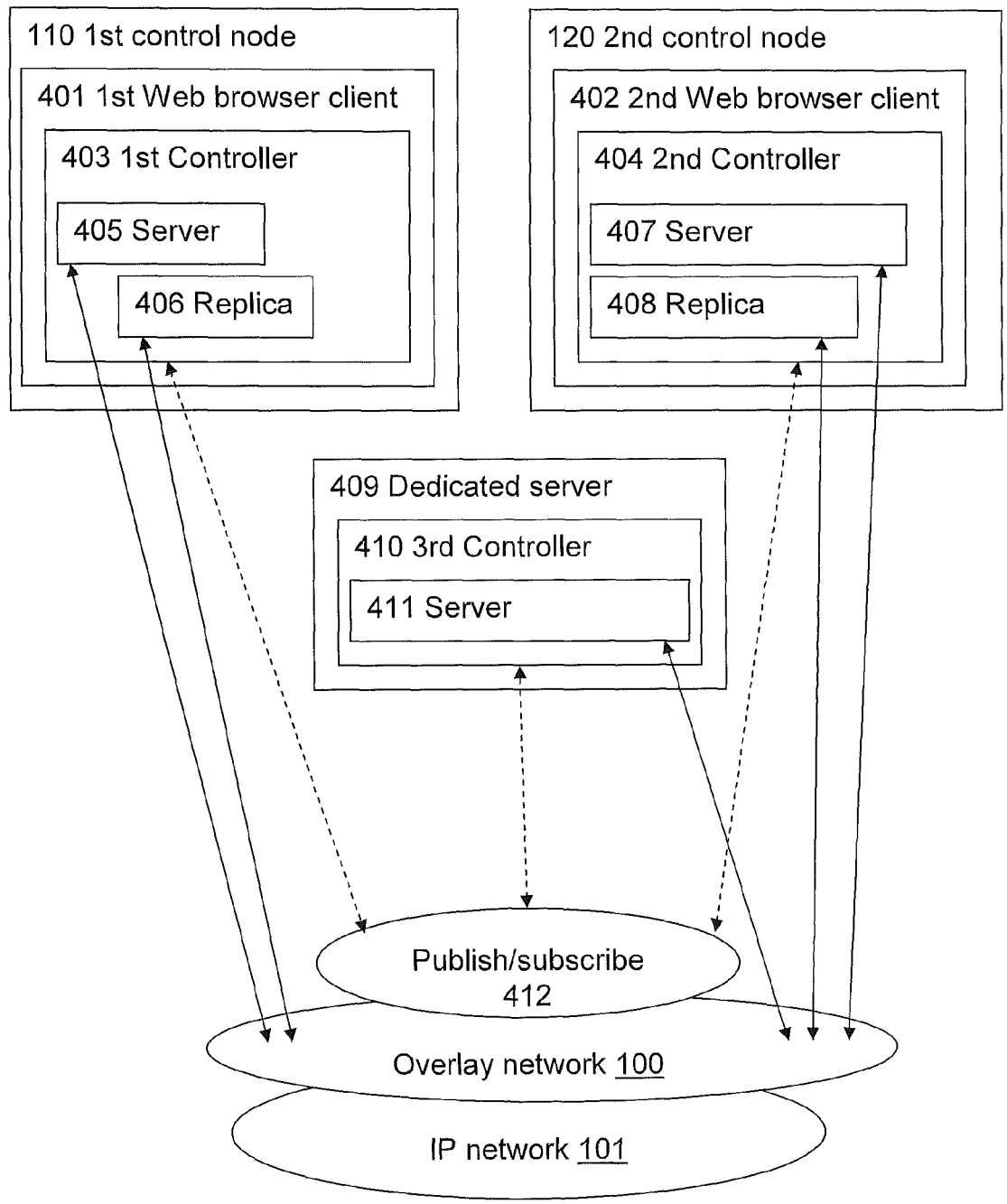
FIG. 4 shows another schematic block diagram of the overlay network according to FIG. 2.

In FIG. 4, the overlay network 100 is exemplified and further details of the nodes 110, 120, 130, 140 are shown. The first control node 110 executes a first web browser client 401 and the second control node 120 executes a second web browser client 402. Each of the first and second web browser clients 401, 402 provides a runtime environment for JavaScript. When the first web browser client 401 downloads a web page, comprising JavaScript for activation of a web collaborative service utilizing DSM, a first controller 403 is executed within the runtime environment of the first web browser client 401. Similarly, a second controller 404 is executed within the second web browser client 402.

In other examples, the web browser clients 401, 402 may be replaced by any clients providing runtime environments, such as virtual machines executed in the control nodes. The control nodes may be provided with any known operation system, such Windows, iOS, Android, Unix or Java.

The first controller 403 may manage a server 405 within the first controller 403. In addition, the first controller 403 may manage a replica 406 own by the first controller 403. Depending on whether the server 405 or the replica 406 is activated within the first controller 403, the controller 403 may act as either a server or a client within the overlay network 100. Similarly, the second controller 404 may manage a server 407 or a replica 408 within the second controller 404.

Moreover, FIG. 4 shows a dedicated server node 409 providing a runtime environment for a third controller 410. Since the third controller 410 is designated to act as a server only, the third controller 410 comprises no replica, but a server 411 for managing a master representation of the DSM. In all other aspects the third controller 410 behaves in the same manner as the first and second controller 403, 404.

A publish/subscribe service 412 is hosted by the subscription managing node 140.

When the first, second and third controllers 403, 404, 410 exchange information for being able to select which node to act as the server, the publish/subscribe service 412 is utilized. See dashed arrows.

However, when each of the first, second and third controllers 403, 404, 410 acts as servers or clients, respectively, the communication between the controllers is independent of the publish/subscribe service. Instead, the overlay network 100 provides client-to-server communication. Hence, the first, second and third controllers are only dependent on the subscription managing node 140, when selection of which controller to act as the server is performed. This is indicated by solid arrows.

Figure 5:
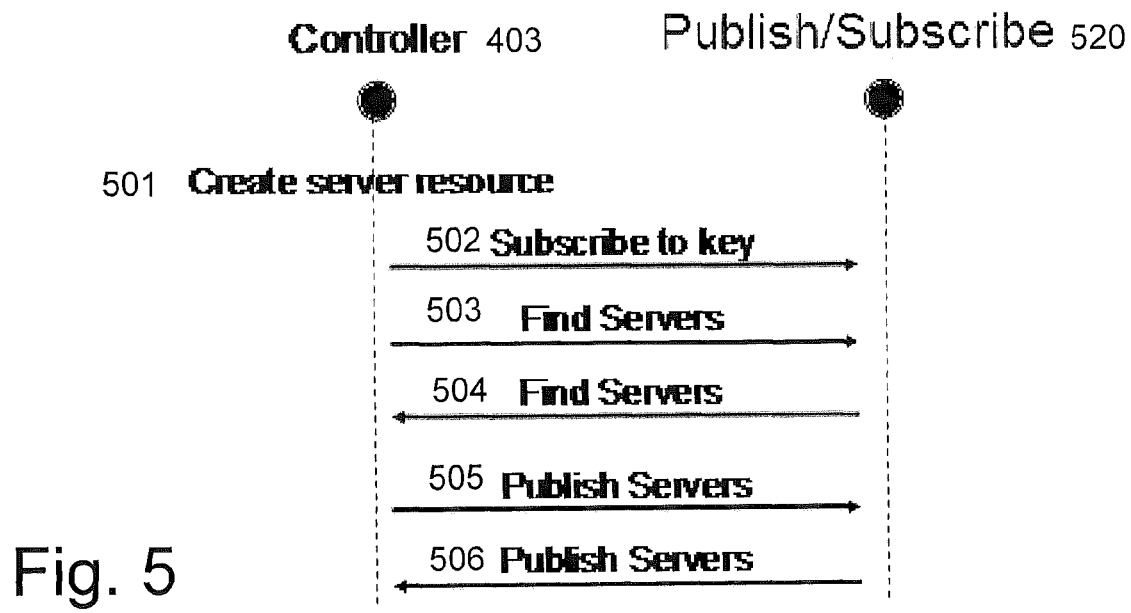
FIG. 5 shows a schematic signalling scheme of an exemplifying method for finding and selecting a control node to act as a server.

With reference to FIG. 5, a schematic signalling scheme of an exemplifying method for finding and selecting a controller 510 to act as a server is shown. In this example, the controller 510 is a software module running within a runtime environment of for example a web browser. The web browser may be executed by the first control node 110. In other examples, the web browser may be executed by the second or third control node 120, 130. In the example described below, the controller 510 may be the first controller 403. In other examples, the controller 510 may be the second controller 404.

Moreover, a publish/subscribe module 520 is shown. As an example, the publish/subscribe module 520 is executed on a dedicated server (not shown). See for example 412 in FIG. 4.

In this example, the following actions are performed. The actions may be performed in any suitable order.

Action 501

The controller 510 starts by creating a server resource. The server resource is simply an address in the overlay network 100 hosted by the controller 510 that at this point in time does not have any DSM master associated with it. This makes the server resource simple and fast to create and host. If it is asked by any client, such as another controller, it will on demand create a DSM master as a sub resource of the root server resource.

As soon as the controller has created the server resource it can notify the framework that it is setup and ready to be used.

At this point, replicas with relative addresses may be created and the controller 510 will direct the replicas to the server resource that is the "best" at this time.

Another possibility is that the controller waits for some time before it notifies the framework in order to also receive answers from others controllers and thus having a better understanding of what server resource would be the best to start with.

Action 502

When the server resource is created (or while the server resource is being created) the controller also sends a subscribe message to the Publish/Subscribe service to register for publications. Each controller registers to receive publications for a specific identifier and thus only other controllers subscribing to that identifier will receive publications. A controller can in this way publish, e.g. send, messages to all other controllers subscribing to that same identifier. This action corresponds to action 302 of FIG. 3.

Action 503

Once the subscription is set up the controller 510 publishes a "find servers"-message to all other controllers asking them for a list of all servers known to them. Since it is subscribing to the publications for this same identifier it will also receive its own message. This action corresponds to action 303 of FIG. 3.

Action 504

If there are other controllers subscribing to the same identifier they will receive the "find servers"-message and will in response thereto publish information about servers known to them. Hence, the controller 510 may receiver a "find servers response"-message. This action corresponds to action 304 of FIG. 3.

In the simplest case however there are no other controllers subscribing to the same identifier and no other server resources will be known.

Action 505

The controller 510 may also send a "publish server"—message comprising information about server resources it is aware of. At this point in time, it is only its own server resource it is aware of. This action corresponds to action 306 of FIG. 3.

Action 506

The controller 510 receives a "publish servers notification"-message. This action corresponds to action 307 of FIG. 3.

As described above, the controller 510 is subscribing and publishing to a service that will broadcast all messages sent by the controller to all other controllers subscribing to the service. It will also set up and publish information about a server resource that it is responsible for.

Once the controller 510 has set up the subscription it will choose, or select, one of the controllers to act as the server. It is then possible to create replicas in the context of the controller and the controller acts as a proxy between the replica and the DSM master replica.

Moreover, the controller 510 may change which controller acts as the server if a better server candidate, i.e. another controller which is more suitable to act as server than the current one, is discovered. For example, if a server with higher rank is discovered at any time the data will be migrated to this server without the user noticing it.

Moving data from one server to another is as simple as creating a controller with higher rank. The merge to the new server is then handled by the controllers.

Figure 6:
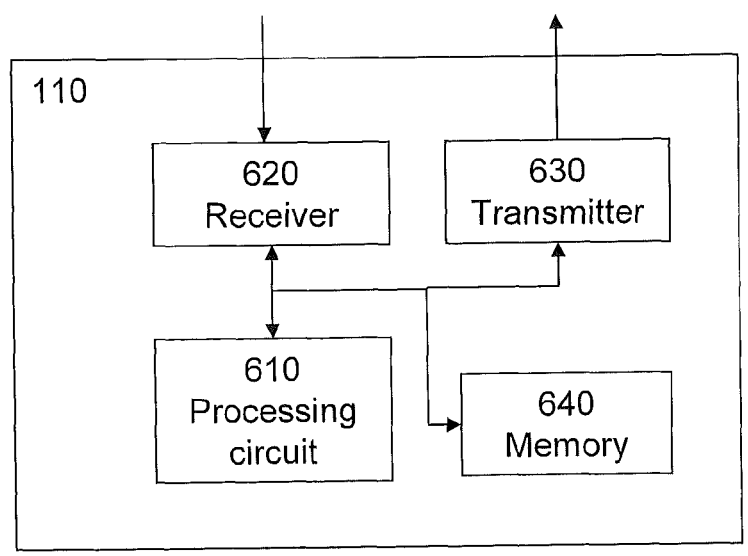
FIG. 6 shows a schematic block diagram of an exemplifying first control node configured to perform the methods illustrated in FIG. 3.

With reference to FIG. 6, a schematic block diagram of the first control node 110, being configured to select the first control node 110 or the second control node 120 to act as a server, is shown. The first control node 110 is configured to perform the methods in FIG. 3 and/or FIG. 5.

As mentioned, the first and second control nodes 110, 120 are configured to be comprised in an overlay network 100. The overlay network 100 is configured to be overlaid onto an IP-network 101 and is further configured to comprise a subscription managing node 140. The subscription managing node 140 is configured to provide a communication channel of the overlay network 100 between the first and second control nodes 110, 120.

The first control node 110 comprises a processing circuit 610 configured to obtain a first indication relating to a ranking of a suitability of the first control node 110 to act as the server. The processing circuit 610 is further configured to select, based on the first and second indications, one of the first and second control nodes 110, 120 to act as the server for managing a master representation of a distributed shared memory being accessible within the overlay network 100.

In some embodiments, the overlay network 100 is further configured to comprise a third control node 130 and the second control node 120 is selected to act as the server. In these embodiments, the processing circuit 610 further is configured to detect lack of response from the server, receive a third indication relating to ranking of the third control node 130 from the third control node 130 via the subscription managing node 140. The third control node 130 has sent the identifier to the subscription managing node 140. The processing circuit 610 is further configured to select the first or third control node 110, 130 to act as the server based on the first and third indication.

In some embodiments, the first control node 110 is selected to act as the server when one or more of the following conditions are fulfilled:

the first ranking value is greater than the second ranking value;

the first start time is before the second start time;

the first number of clients is greater than the second number of clients; and the first connection speed is greater than the second connection speed.

The processing circuit 610 may further be configured to obtain the first indication from a memory 640 comprised in the first control node 110.

The processing circuit 610 may be a processing unit, a processor, an application specific integrated circuit (ASIC), a field-programmable gate array (FPGA) or the like. As an example, a processor, an ASIC, an FPGA or the like may comprise one or more processor kernels.

The first control node 110 further comprises a receiver 620 configured to receive, over the communication channel, a second indication, from the second control node 120 via the subscription managing node 140. The second indication relates to a ranking of a suitability of the second control node 120 to act as the server.

The receiver 620 may further be configured to receive a set of identifications of control nodes from the subscription managing node 140.

The receiver 620 may further be configured to receive the first indication relating to ranking of the first control node 110 from the subscription managing node 140.

The first control node 110 further comprises a transmitter 630 configured to send an identifier associated with the communication channel to the subscription managing node 140. In this manner, the communication channel is established. The communication channel is dedicated for use of the distributed shared memory.

The transmitter 630 is further configured to send a request for identifications of control nodes to the subscription managing node 140.

The transmitter 630 is further configured to send the first indication relating to ranking of the first control node 110 as server host to the subscription managing node 140.

The first control node 110 further comprises a memory 640 which according to some embodiments is configured to store software to be executed by, for example, the processing circuit. The software may comprise instructions to enable the processing circuit to perform the method in the first control node 110 as described above in conjunction with FIG. 3 and/or 6. The memory 640 may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first control node for selecting the first control node or a second control node to act as a server for managing a master representation of a distributed shared memory being accessible within an overlay network, wherein the first and second control nodes and a subscription managing node are comprised in the overlay network, the overlay network being overlaid onto an IP-network, wherein the subscription managing node is configured to provide a communication channel of the overlay network between the first and second control nodes, the method comprising:

obtaining a first indication relating to a ranking of a suitability of the first control node to manage the master representation of the distributed shared memory;

sending a request for indications to the subscription managing node;

receiving, over the communication channel, a second indication in response to the request for indications from the second control node via the subscription managing node, wherein the second indication relates to a ranking of a suitability of the second control node to manage the master representation of the distributed shared memory; and selecting, based on the first and second indications, one of the first and second control nodes to manage the master representation of the distributed shared memory.

2. The method according to claim 1, further comprising:

sending an identifier associated with the communication channel to the subscription managing node, whereby the communication channel is established, wherein the communication channel is dedicated for use of the distributed shared memory.

3. The method according to claim 1, further comprising:

sending a request for identifications of control nodes to the subscription managing node; and receiving a set of identifications of control nodes from the subscription managing node.

4. The method according to claim 1, further comprising:

sending, to the subscription managing node, the first indication relating to ranking of the first control node as the server.

5. The method according to claim 1, wherein the overlay network further comprises a third control node, the second control node being the server, and wherein the method further comprises:

detecting lack of response from the server;

receiving a third indication relating to ranking of the third control node from the third control node via the subscription managing node, wherein the third control node has sent the identifier to the subscription managing node; and selecting the first or third control node to act as the server based on the first and third indication.

6. The method according to claim 1, wherein the obtaining comprises:

receiving the first indication relating to ranking of the first control node from the subscription managing node; or obtaining the first indication from a memory comprised in the first control node.

7. The method according to claim 1, wherein the first indication relating to ranking comprises information that is indicative of a first number of clients connected to the first control node if acting as the server or a further server for managing the distributed shared memory.

8. The method according to claim 7, wherein the second indication relating to ranking comprises information that is indicative of a second number of clients connected to the second control node if acting as the server or a further server for managing the distributed shared memory.

9. The method according to claim 8, wherein the first control node is selected to act as the server when the first number of clients is greater than the second number of clients.

10. The method according to claim 1, wherein the overlay network is overlaid onto a TCP/IP-network.

11. The method according to claim 1, wherein the ranking of the first control node is indicative of probability that the first control node remains accessible within the overlay network.

12. The method according to claim 1, wherein the first and second control nodes are capable of acting as the server or a client within the overlay network.

13. A first control node configured to select the first control node or a second control node to act as a server for managing a master representation of a distributed shared memory being accessible within an overlay network, wherein the first and second control nodes are configured to be comprised in the overlay network, which overlay network is configured to be overlaid onto an IP-network and further is configured to comprise a subscription managing node, which subscription managing node is configured to provide a communication channel of the overlay network between the first and second control nodes, wherein the first control node comprises:
 a processing circuit configured to:
 obtain a first indication relating to a ranking of a suitability of the first control node to manage the master representation of the distributed shared memory;
 send a request for indications to the subscription managing node;
 select, based on the first indication and a second indication, one of the first and second control nodes to manage the master representation of the distributed shared memory; and
 a receiver configured to receive, over the communication channel, the second indication in response to the request for indications, from the second control node via the subscription managing node, which second indication indicates a ranking of a suitability of the second control node to manage the master representation of the distributed shared memory.

14. The first control node according to claim 13, further comprising:
 a transmitter configured to send an identifier associated with the communication channel to the subscription managing node, whereby the communication channel is established, wherein the communication channel is dedicated for use of the distributed shared memory.

15. The first control node according to claim 13, wherein the transmitter is further configured to send a request for identifications of control nodes to the subscription managing node, and wherein the receiver is further configured to receive a set of identifications of control nodes from the subscription managing node.

16. The first control node according to claim 13, wherein the transmitter is further configured to send the first indication relating to ranking of the first control node as server host to the subscription managing node.

17. The first control node according to claim 13, wherein the overlay network further is configured to comprise a third control node, the second control node being the server, and wherein the processing circuit further is configured to:
 detect lack of response from the server;
 receive a third indication related to ranking of the third control node from the third control node via the subscription managing node, wherein the third control node has sent the identifier to the subscription managing node; and
 select the first or third control node to act as the server based on the first and third indication.

18. The first control node according to claim 13, wherein the receiver further is configured to receive the first indication relating to ranking of the first control node from the subscription managing node; or
 wherein the processing circuit further is configured to obtain the first indication from a memory comprised in the first control node.

19. The first control node according to claim 13, wherein the first indication relating to ranking comprises information that is indicative of a first number of clients connected to the first control node if acting as the server or a further server for managing the distributed shared memory.

20. The first control node according to claim 19, wherein the second indication relating to ranking comprises information that is indicative of
 a second number of clients connected to the second control node if acting as the server or a further server for managing the distributed shared memory.

21. The first control node according to claim 20, wherein the first control node is selected to act as the server when the first number of clients is greater than the second number of clients.

22. The first control node according to claim 13, wherein the overlay network is overlaid onto a TCP/IP-network.

23. The first control node according to claim 13, wherein the ranking of the first control node is indicative of probability that the first control node remains accessible within the overlay network.

24. The first control node according to claim 13, wherein the first and second control nodes are capable of acting as the server or a client within the overlay network.

* * * * *